April 30, 1935.  E. ANSELMI  1,999,889
OPTICAL INSTRUMENT FOR TESTING ORGANIC LIQUIDS
Filed Jan. 4, 1933

E. Anselmi
INVENTOR

By Marks & Clerk
Attys.

Patented Apr. 30, 1935

1,999,889

UNITED STATES PATENT OFFICE 1,999,889

OPTICAL INSTRUMENT FOR TESTING ORGANIC LIQUIDS

Ernesto Anselmi, Viterbo, Italy

Application January 4, 1933, Serial No. 650,159 In Italy January 11, 1932

2 Claims. (Cl. 88—14)

My invention relates to a pocketable optical instrument allowing the observation, without the use of lenses, of the peculiarities and single details, not discernible or not very discernible in the usual chemical reactions in test tubes, of physico-chemical phenomena in organic liquids by precipitation, coagulation, flocculation, and so on, and particularly suitable for the analysis of urine by an examination of only a few drops of liquid on the bed of the patent. The instrument may be called "Uropathoscope". The instrument according to my invention is employed by a new method of observing the said phenomena; as will be described in the following specification.

The instrument according to my invention is disclosed in the annexed drawing, of which:—

Figure 2:
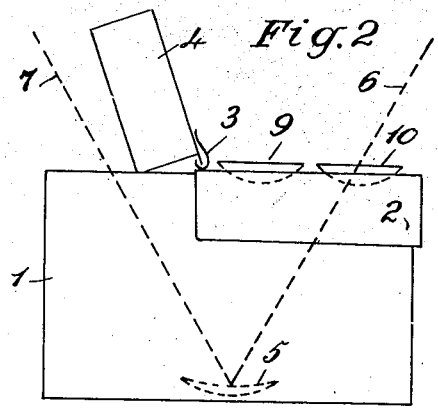
Figs. 2 and 3 show in elevation the instrument opened in two different positions of use.
Figure 3:
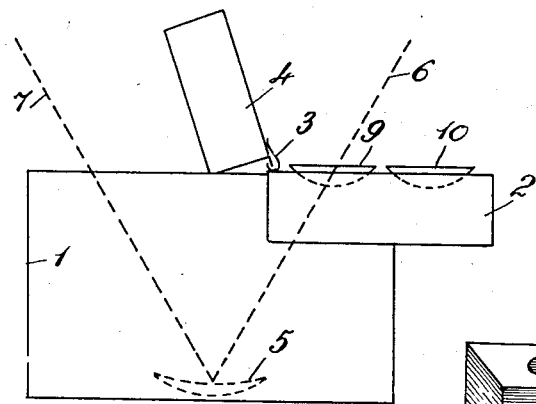
Figure 4:
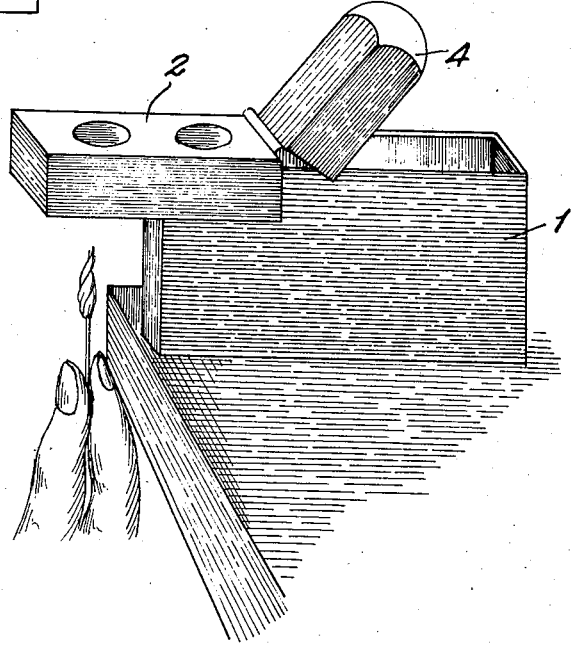
Fig. 4 is a perspective view showing the instrument when the test glass is heated by a flame.

The instrument, as shown in the drawing, consists of a metallic box 1, internally blackened, of pocketable dimensions, and provided with a sectional cover, the main section 2 being slidable along the side-walls of the box, and having at one end two circular holes, and having at the inner end a hinge-joint 3, so as to allow the plain section 4 to be raised as shown in the Figures 2 and 3. On the bottom of the little box, a concave mirror 5 is fixed in such a position that a ray of light 6, entering in the box from the outside, refracted by the liquid to be tested and passing through the holes in the cover, may fall on the mirror, and will be reflected to the point 7 representing the eyes of the observer; the section 4 of the cover being raised as shown in Figures 2 and 3.

Figure 1:
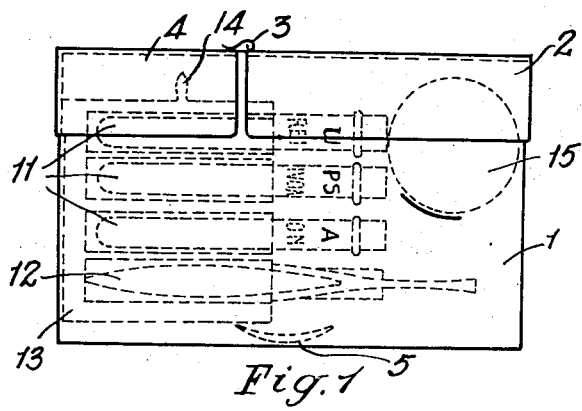
Fig. 1 is an elevational view of the instrument closed.

The instrument is further provided with a number of chemical reagents all of them in solid or solidified form for the different reactions to execute and with a number of little concave dishes 9, 10, entirely free of impurities or blisters which could alter their perfect transparency, and capable of containing two to three drops of the liquid to be tested. The dishes 9 and 10 may be made of glass or use may be made for cold reactions of little celluloid or other transparent material dishes, to be destroyed after the test, for sake of hygiene and cleanliness. The Figures 2 and 3 show the dishes 9 and 10 applied over the holes of the cover in position for observation. The instrument is completed by a very small spoon or spatula as a measure for taking the reagents and for introducing them in the liquid, by a forceps 12 to handle and clean the test glasses 11, by a pipette, and so on. The reagents contained in small, well stopped glass tubes 11, and all of the other fittings, are exactly placed in corresponding holes in a small parallelopiped casing 13 of light-weight material such as wood, aluminum, bakelite, or ebonite. The said casing 13 is fixed in the box 1 by means of two side-grooves (not shown in the drawing) holding it when the instrument is closed (Fig. 1). When an analysis has to be made, the small box 1 is opened, the casing 13 taken out, lifting it by its knob 14 (see the section in Fig. 1); then the box 1 is empty and ready for use. A very small cylindrical box 15 with bayonet-closure and containing an equipment of the foresaid concave dishes 9 and 10 as well as little discs of test-paper, fills in the metallic box 1 the space not occupied by the reagent casing 13 and is pulled out following this casing. In this very simple way and with only one movement, the observer will have at hand all that is necessary for his examination.

For the observation, approach the instrument to a window or a lamp so as to have the light possibly from above under an angle of about 45°; take out from the metallic box 1 the reagent casing and the cylindrical box with the test-glasses, so as to discover the mirror fixed on the bottom of the casing. Fit on the casing the cover 2, leaving the section 4 raised (Figs. 2 and 3), place one of the small glasses or dishes of the equipment in each of the two holes in the cover, and by means of a pipette, place in each glass 2 or 3 drops of urine.

It is advisable to make at once an observation in order to get a notion of the characteristics of the liquid to be tested, looking at the image reflected by the mirror. Then, with the small spatula, take out from the reagent tube No. 1 (sulpho-salicylic acid) just the quantity of reagent contained by the spatula, without over-measure, and introduce it in the liquid of one of the two dishes. The same is to be done with the contents of the reagent tube No. 2 (citric or tartaric acid in finest powder), putting in the second dish the quantity of reagent contained on a spatula well filled up. Observe, as soon as possible, the image reflected by the mirror in the first and in the second dish, by placing the instrument alternatively in the two positions shown in the Figures 1 and 2, sliding the cover along the box, so that to the eye appears alternatively the image of the one and of the other test glass. This operation is continued until the reactions of coagulation or precipitation, caused by the reagents in the liquid containing the searched protein substances, are evidently completed and definitive; not more than 1-2 minutes are required.

With regard to the use of solid reagents only, it may be stated that in the instrument according to the invention, it is always the urine or other liquid in examination which has the function of solvent, this circumstance allowing for the highest simplicity and practical convenience without diminution of the exactness and sensitiveness of the instrument.

I claim:

1. A pocket optical instrument adapted for extemporary and quick clinical examinations of organic liquids, specially of urine, without the use of lenses, comprising in combination an internally blackened box, a concave mirror mounted on the upper surface of the bottom of the box, a cover for the box composed of two sections, one of the sections being pivoted to the other and being raisable to allow the observation of the mirror, the other section being apertured and adapted to receive two transparent test dishes so as to allow the rays of light to fall through the test liquids on the mirror, and being slidable on the box when the first section is in a raised position so as to allow alternative and comparative observation of two transparency images in the mirror.

2. A pocket optical instrument adapted for extemporary and quick clinical examinations of organic liquids, specially of urine, without the use of lenses, comprising in combination an internally blackened box, a concave mirror mounted on the upper surface of the bottom of the box, a cover for the box composed of two sections, one of the sections being pivoted to the other and being raisable to allow the observation of the mirror, the other section being apertured and adapted to receive two transparent test dishes so as to allow the rays of light to fall through the test liquids on the mirror, and being slidable on the box when the first section is in a raised position so as to allow alternative and comparative observation of two transparency images in the mirror, the space between the bottom of the box and the cover when the latter is closed constituting a free room adapted to receive an equipment carrying casing.

ERNESTO ANSELMI.